United States Patent
Lien

(10) Patent No.: US 7,693,065 B2
(45) Date of Patent: Apr. 6, 2010

(54) PACKET TRANSCEIVER SYSTEM AND METHOD

(75) Inventor: Chu-Feng Lien, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 503 days.

(21) Appl. No.: 11/647,730

(22) Filed: Dec. 29, 2006

(65) Prior Publication Data

US 2008/0095056 A1    Apr. 24, 2008

(30) Foreign Application Priority Data

Oct. 20, 2006    (TW) ............... 95138867 A

(51) Int. Cl.
*G01R 31/08*    (2006.01)

(52) U.S. Cl. ................................. 370/235

(58) Field of Classification Search .......... 370/229–240
See application file for complete search history.

(56) References Cited

U.S. PATENT DOCUMENTS

| | | | |
|---|---|---|---|
| 6,584,072 B1 * | 6/2003 | Dawes | 370/252 |
| 6,785,262 B1 | 8/2004 | Yao et al. | |
| 6,982,957 B2 | 1/2006 | Kiiski et al. | |
| 7,036,069 B2 | 4/2006 | Rey et al. | |
| 7,155,654 B2 | 12/2006 | Chien et al. | |
| 2002/0085498 A1 * | 7/2002 | Nakamichi et al. | 370/236 |
| 2005/0195740 A1 * | 9/2005 | Kwon | 370/229 |
| 2006/0262853 A1 * | 11/2006 | Li et al. | 375/240.16 |

FOREIGN PATENT DOCUMENTS

| | | |
|---|---|---|
| CN | 1468001 A | 1/2004 |
| CN | 1182683 C | 12/2004 |
| TW | 548929 | 8/2003 |
| TW | 242949 | 11/2005 |

\* cited by examiner

*Primary Examiner*—Kwang B Yao
*Assistant Examiner*—Tung Q Tran
(74) *Attorney, Agent, or Firm*—Wei Te Chung

(57) ABSTRACT

A packet transceiver system includes a detection module (210), a dropped rate determination module (110), a transmitting module (120), and a recalculation module (230). The detection module detects a network congestion status. The dropped rate determination module determines a packet dropped rate based on the network congestion status. The transmitting module transmits voice packets, dropping voice packets according to the packet dropped rate, ensuring an even distribution of dropped voice packets during the transmission. The recalculation module receives the un-dropped voice packets, and recalculates the dropped voice packets. A packet transceiver method is also provided.

12 Claims, 6 Drawing Sheets

PACKET TRANSCEIVER SYSTEM AND METHOD

BACKGROUND OF THE INVENTION

1. Field of the Invention

The invention relates to network communications, and particularly to a packet transceiver system and method.

2. Description of Related Art

Voice over Internet (VoIP) is a standard for transmitting voice, which relies on using real-time transport protocol (RTP). RTP is built upon the user datagram protocol (UDP).

However, UDP lacks a feedback mechanism, so RTP packets are liable to be lost during network congestion, thereby affecting voice quality. Referring to FIG. 1, a transmitter 10 transmits a plurality of voice packets to a receiver 20 during network congestion, and voice packets 100b are lost in groups. The lost voice packets 100b are difficult to be recalculated according to normal voice packets 100a, and accordingly voice quality is poor.

SUMMARY OF THE INVENTION

An exemplary embodiment of the present invention provides a packet transceiver system. The packet transceiver system includes a detection module, a dropped rate determination module, a transmitting module, and a recalculation module. The detection module detects a network congestion status. The dropped rate determination module determines a packet dropped rate based on the network congestion status. The transmitting module transmits voice packets, dropping voice packets according to the packet dropped rate, ensuring an even distribution of dropped voice packets during the transmission. The recalculation module receives the un-dropped voice packets, and recalculates the dropped voice packets.

Another exemplary embodiment of the present invention provides a packet transceiver method. The packet transceiver system includes the following steps. A receiver detects a network congestion status. A transmitter determines a packet dropped rate based on the network congestion status. The transmitter transmits voice packets, dropping voice packets according to the packet dropped rate, ensuring an even distribution of dropped voice packets during the transmission. The receiver receives the un-dropped voice packets, and recalculates the dropped voice packets.

Other advantages and novel features will become more apparent from the following detailed description when taken in conjunction with the accompanying drawings, in which:

DETAILED DESCRIPTION OF THE INVENTION

Figure 1:
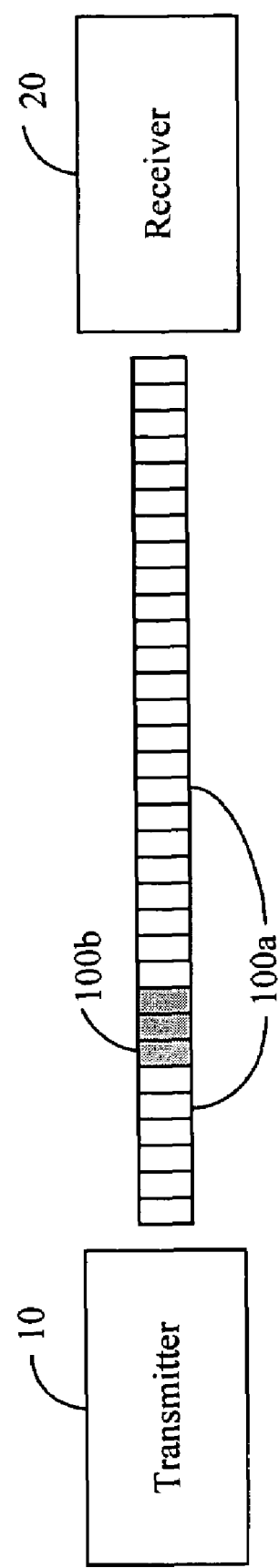
FIG. 1 is a schematic diagram showing voice packets being randomly lost.
Figure 2:
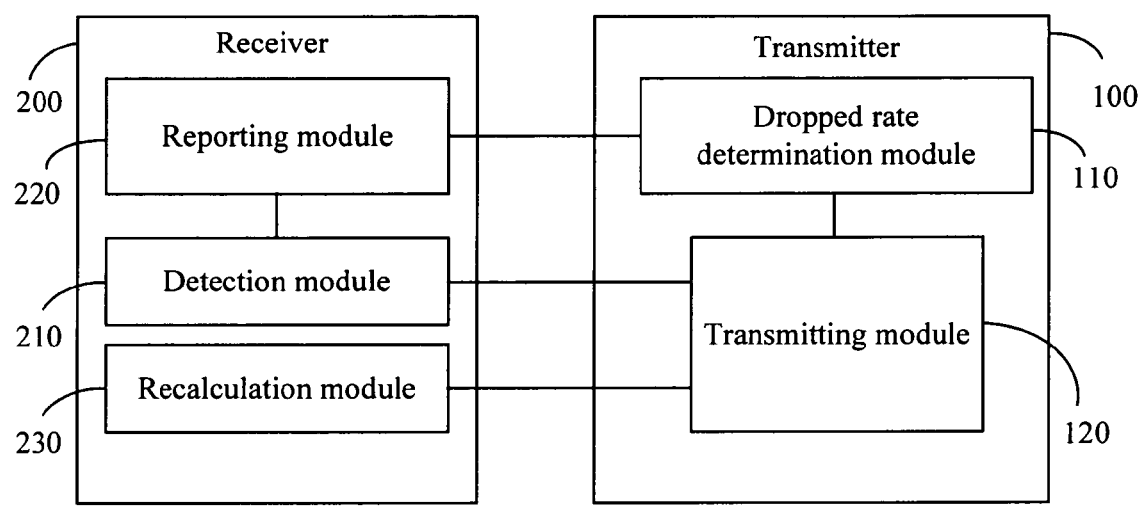
FIG. 2 is a schematic diagram of functional modules of a packet transceiver system of an exemplary embodiment of the present invention.

FIG. 2 is a schematic diagram of functional modules of a packet transceiver system of an exemplary embodiment of the present invention. In exemplary embodiment, the packet transceiver system is in a managed network, such as a closed network held by a telecommunication office. The packet transceiver system includes a transmitter 100 and a receiver 200. The transmitter 100 communicates with the receiver 200 through voice over Internet protocol (VoIP).

In the exemplary embodiment, the transmitter 100 initially transmits a plurality of antecedent voice packets to the receiver 200. The receiver 200 receives the plurality of antecedent voice packets, and detects a network congestion status. Then the transmitter 100 determines a packet dropped rate based on the network congestion status, and transmits voice packets, dropping voice packets according to the packet dropped rate, ensuring an even distribution of dropped voice packets during the transmission. The receiver 200 receives the un-dropped voice packets, and recalculates the dropped voice packets. Thus, network traffic is effectively reduced, and voice quality between the transmitter 100 and the receiver 200 is maintained. Accordingly, network efficiency is effectively improved.

The transmitter 100 includes a dropped rate determination module 110 and a transmitting module 120. The transmitting module 120 transmits a plurality of antecedent voice packets to the receiver 200.

The receiver 200 includes a detection module 210, a reporting module 220, and a recalculation module 230.

The detection module 210 receives the plurality of antecedent voice packets, and detects a network congestion status. In the exemplary embodiment, the network congestion status is a packet lost rate, namely a lost rate of the antecedent voice packets transmitted from the transmitter 100 to the receiver 200. Each antecedent voice packet from the transmitter 100 includes a sequence number for the receiver 200 to detect lost packets in the antecedent voice packets. The detection module 210 detects the packet lost rate, namely the network congestion network, according to the sequence numbers of the antecedent voice packets.

The reporting module 220 reports the network congestion status to the dropped rate determination module 110 of the transmitter 100. In the exemplary embodiment, the reporting module 220 reports the network congestion status to the transmitter 100 via a header extension field of a real-time transport protocol (RTP) packet, so additional cost for amending protocols is not needed. The header extension field is included in an RTP header 1000 of the RTP packet.

Figure 3:
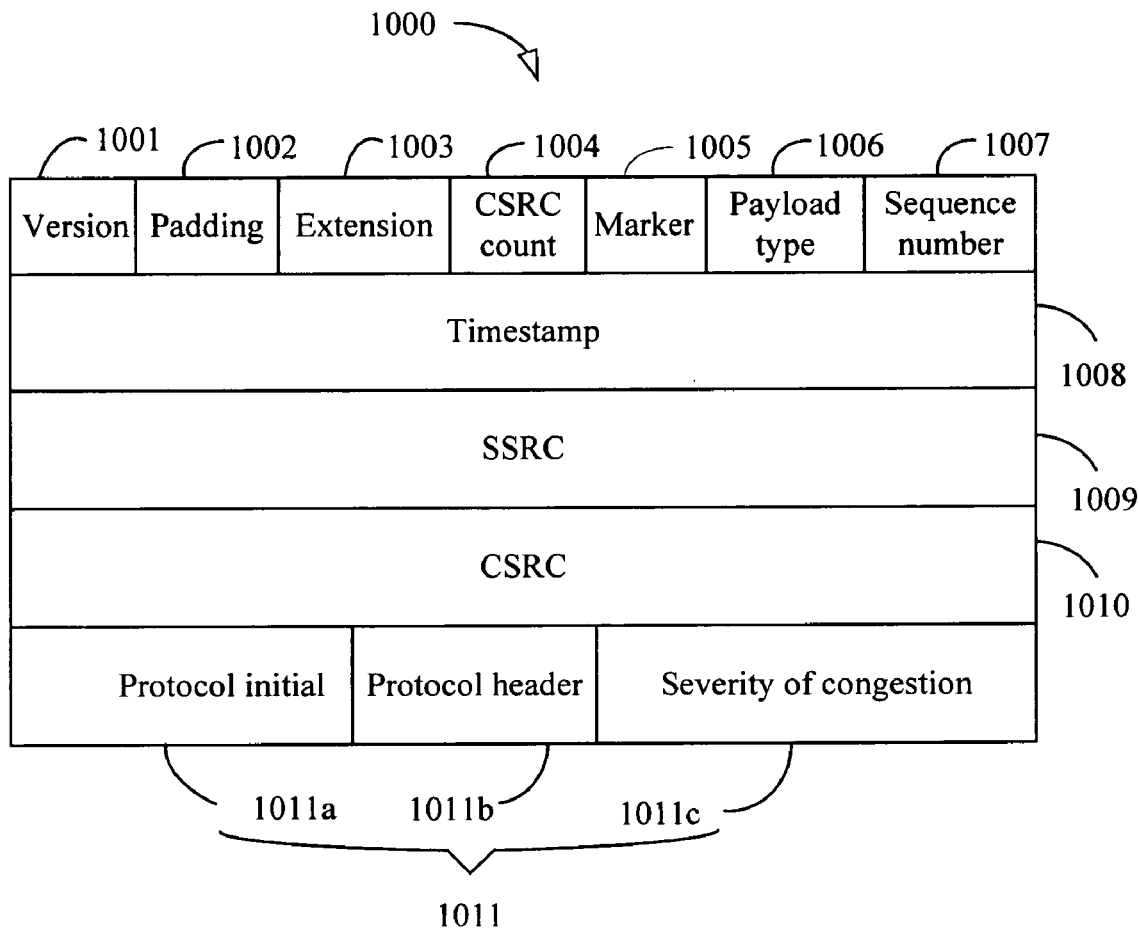
FIG. 3 is a schematic diagram of a real-time transport protocol (RTP) header of another exemplary embodiment of the present invention.

Referring to FIG. 3, the RTP header 1000 includes a version (V) field 1001, a padding (P) field 1002, an extension (X) field 1003, a contributing source identifier (CSRC) count (CC) field 1004, a marker (M) field 1005, a payload type 1006, a sequence number field 1007, a timestamp field 1008, a synchronization source identifier (SSRC) field 1009, a CSRC field 1010, and a header extension field 1011.

In this embodiment, the reporting module 220 reports the network congestion status by setting the extension field 1003 and the header extension field 1011.

The extension field 1003 is for indicating whether the header extension 1011 is set. In the exemplary embodiment, the extension field 1003 is set to 1, indicating the header extension field 1011 is set.

The header extension field 1011 is for transmitting the network congestion status. In this embodiment, the header extension field 1011 includes a protocol initial field 1011a, a protocol header field 1011b, and a severity of congestion field 1011c.

The protocol header field 1011b is for indicating a type of information in the severity of congestion field 1011c. The severity of congestion field 1011c is for carrying the network congestion status, namely the packet lost rate. In exemplary embodiment, the protocol header field 1011b is set to 101, indicating the information in the severity of congestion field 1011c is the network congestion status, namely the packet lost rate.

The protocol initial field 1011a is for padding the header extension field 1011. In the exemplary embodiment, the header extension field 1011 has a 32-bit length, the protocol initial field 1011 has a 16-bit length, the protocol header field 1011b has a 3-bit length, and the severity of congestion field 1011c has a 13-bit length. The protocol initial field 1011a is padded with 16 0's, for filling in the header extension field 1011.

In other embodiments, the header extension field 1011 may be divided into other fields according to different requirements.

The dropped rate determination module 110 of the transmitter 100 determines a packet dropped rate based on the network congestion status. In the exemplary embodiment, the dropped rate determination module 110 receives the RTP packet to obtain the network congestion status, namely the packet lost rate, and then determines the packet dropped rate based on the packet lost rate. In this embodiment, the determined packet dropped rate is equal to the packet lost rate.

The transmitting module 120 transmits voice packets, dropping voice packets according to the packet dropped rate, ensuring an even distribution of dropped voice packets during the transmission.

Figure 4:
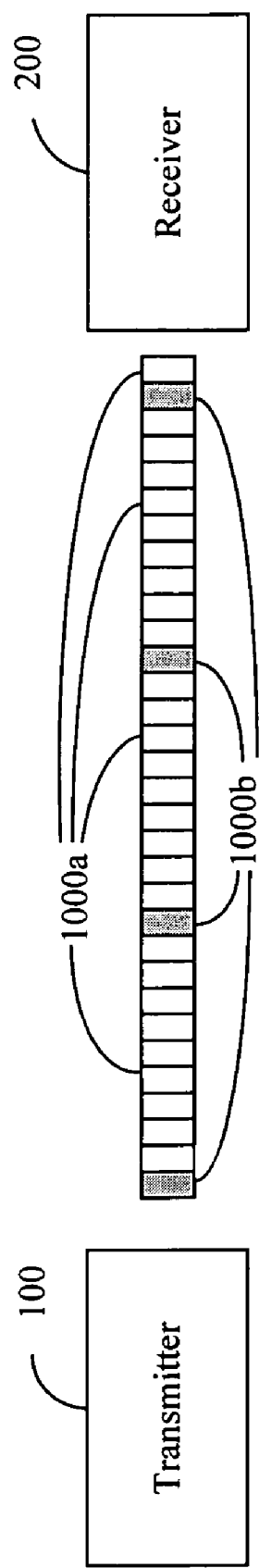
FIG. 4 is a schematic diagram showing an even distribution of dropped voice packets of a further exemplary embodiment of the present invention.

For example, if the packet lost rate is 10%, the determined packet dropped rate is also 10%. In such case, the transmitting module 120 drops voice packets according to the 10% dropped rate. That is, the transmitting module 120 drops one voice packet in every ten voice packets. As shown in FIG. 4, dropped voice packets 1000b are evenly distributed among normal voice packets 1000a according to the 10% dropped rate.

The recalculation module 230 of the receiver 200 receives the un-dropped voice packets, and recalculates the dropped voice packets. In exemplary embodiment, the recalculation module 230 receives the normal voice packets 1000a from the transmitting module 120 of the transmitter 100, and then recalculates the dropped voice packets 1000b using mathematical methods. The recalculation module 230 also adds the recalculated voice packets to the received voice packets.

In the exemplary embodiment, the recalculation module 230 may be a digital signal processor (DSP) that has functions that use interpolation methods. The dropped voice packets are evenly distributed among normal voice packets, so the recalculation module 230 can recalculate the dropped voice packets using interpolation methods to maintain voice quality.

Figure 5:
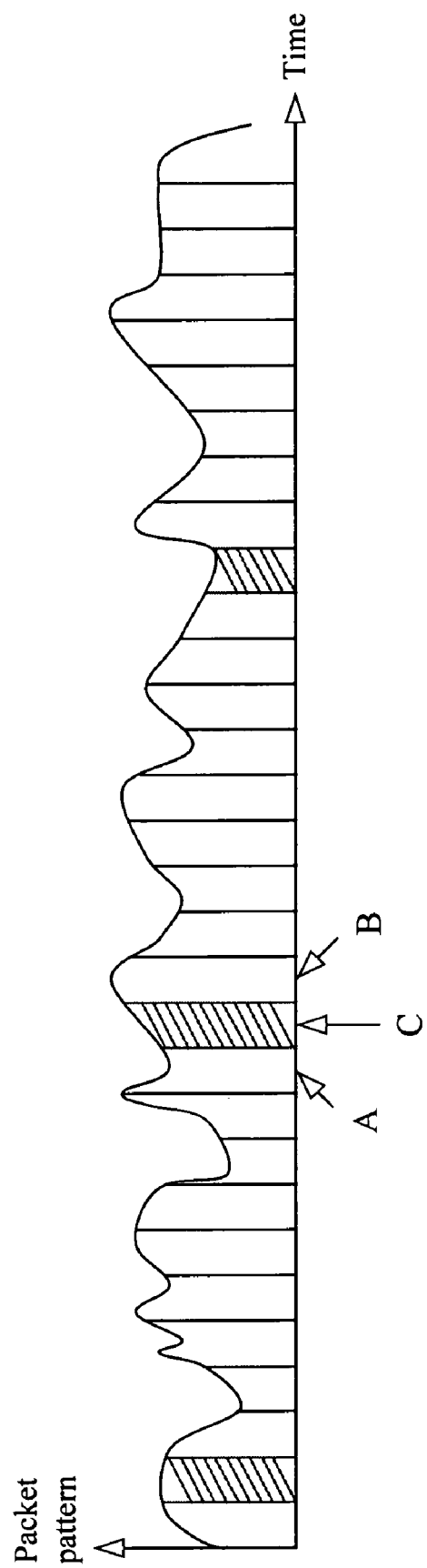
FIG. 5 is a schematic diagram showing voice packets being recalculated of a still further exemplary embodiment of the present invention.

For example, referring to FIG. 5, a dropped voice packet C can be recalculated using a linear interpolation method of the normal voice packets A and B. It should be noted that the recalculation method of the dropped voice packets is not restricted in the linear interpolation method, and may be other mathematical calculation methods, such as polynomial interpolation, spline interpolation, and rational interpolation methods.

Figure 6:
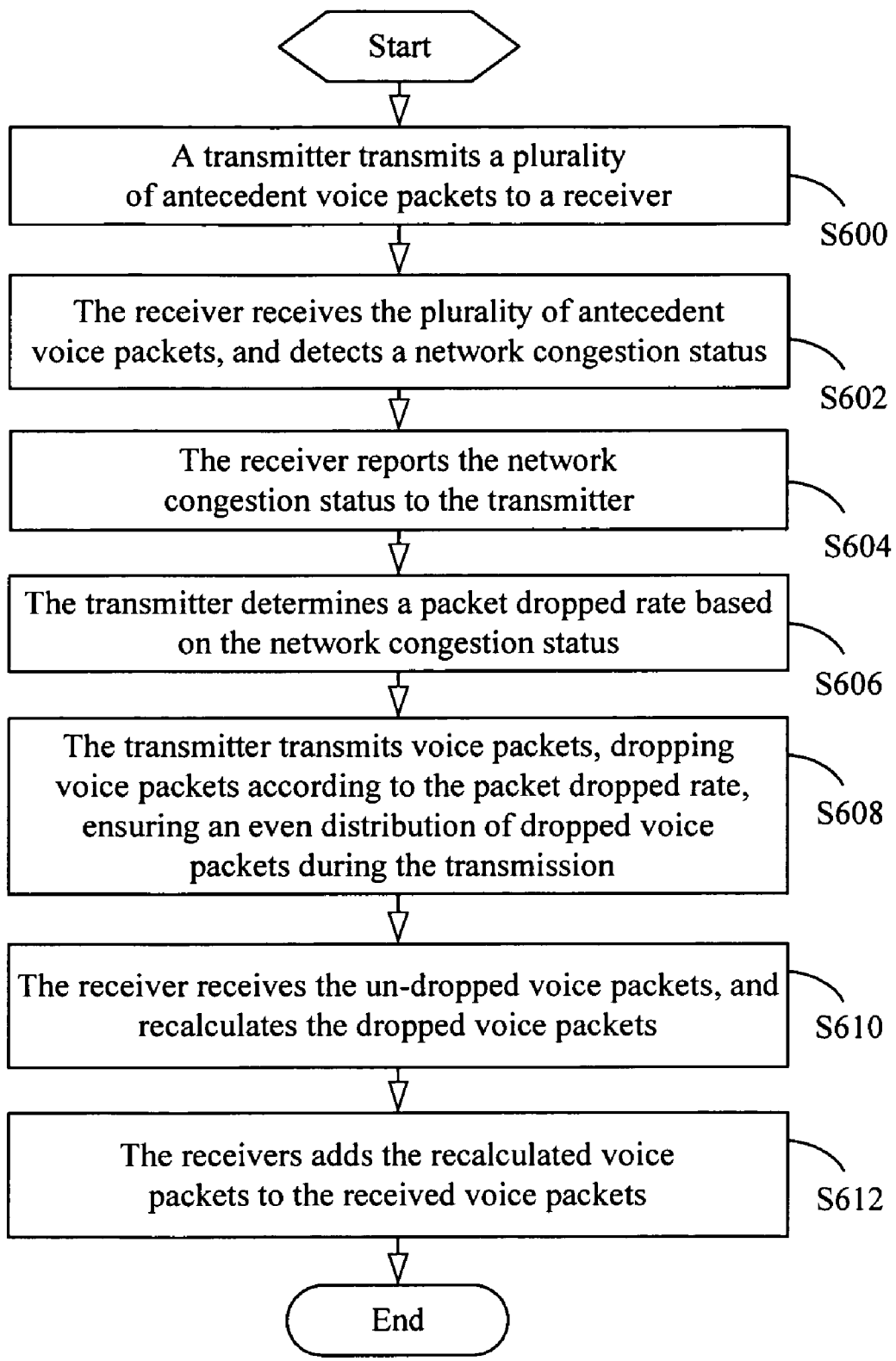
FIG. 6 is a flowchart of a packet transceiver method of a yet further exemplary embodiment of the present invention.

FIG. 6 is a flowchart of a packet transceiver method of an exemplary embodiment of the present invention. In the exemplary embodiment, the transmitter 100 communicates with the receiver 200 through VoIP.

In step S600, the transmitter 100 transmits a plurality of antecedent voice packets to the receiver 200.

In step S602, the receiver 200 receives the plurality of antecedent voice packets, and detects a network congestion status. In the exemplary embodiment, the network congestion status is a packet lost rate. Each antecedent voice packet from the transmitter 100 includes a sequence number for the receiver 200 to detect lost packets in the antecedent voice packets. The detection module 210 detects the packet lost rate, namely the network congestion status, according to the sequence numbers of the antecedent voice packets.

In step S604, the receiver 100 reports the network congestion status to the transmitter 100. In the exemplary embodiment, the reporting module 220 reports the network congestion status to the transmitter 100 via a header extension field of a RTP packet. The header extension field is included in the RTP header 1000 of the RTP packet.

In this embodiment, the reporting module 220 reports the network congestion status by setting the extension field 1003 and the header extension field 1011 of the RTP header 1000 of FIG. 3.

The extension field 1003 is for indicating whether the header extension 1011 is set. In the exemplary embodiment, the extension field 1003 is set to 1, indicating the header extension field 1011 is set.

The header extension field 1011 is for transmitting the network congestion status. In this embodiment, the header extension field 1011 includes a protocol initial field 1011a, a protocol header field 1011b, and a severity of congestion field 1011c.

The protocol header field 1011b is for indicating a type of information in the severity of congestion field 1011c. The severity of congestion field 1011c is for carrying the network congestion status, namely the packet lost rate. In exemplary embodiment, the protocol header field 1011b is set to 101, indicating the information in the severity of congestion field 1011c is the network congestion status, namely the packet lost rate.

The protocol initial field 1011a is for padding the header extension field 1011. In the exemplary embodiment, the header extension field 1011 contains a 32-bit length, the protocol initial field 1011a contains a 16-bit length, the protocol header field 1011b contains a 3-bit length, and the severity of congestion field 1011c contains a 13-bit length. The protocol initial field 1011a is padded with 16 continues 0, for filling in the header extension field 1011.

In other embodiments, the header extension field 1011 may be divided into other fields according to different requirements.

In step S606, the transmitter 100 determines a packet dropped rate based on the network congestion status. In the exemplary embodiment, the dropped rate determination module 110 receives the RTP packet to obtain the network congestion status, namely the packet lost rate, and then determines the packet dropped rate based on the packet lost rate. In this embodiment, the determined packet dropped rate is equal to the packet lost rate.

In step S608, the transmitter 100 transmits voice packets, dropping voice packets according to the packet dropped rate, ensuring an even distribution of dropped voice packets during the transmission.

For example, if the packet lost rate is 10%, the determined packet dropped rate is also 10%. In such case, the transmitting module 120 drops voice packets according to the 10% dropped rate. As shown in FIG. 4, the dropped voice packets 1000b are evenly distributed among the normal voice packets 1000a during transmission, according to the 10% dropped rate.

In step S610, the receiver 200 receives the un-dropped voice packets, and recalculates the dropped voice packets. In the exemplary embodiment, the recalculation module 230 receives the normal voice packets 1000a from the transmitting module 120 of the transmitter 100, and then recalculates the dropped voice packets 1000b using mathematical methods.

In the exemplary embodiment, the recalculation module 230 may be a DSP that has functions that use interpolation methods. The dropped voice packets are evenly distributed among normal voice packets, so the recalculation module 230 can recalculate the dropped voice packet using interpolation methods to maintain voice quality.

In step S612, the receiver 200 adds the recalculated voice packets to the received voice packets. In the exemplary embodiment, the recalculation module 230 adds the recalculated voice packet 1000b to the received voice packets 1000a.

In the embodiment of the present invention, the receiver 200 transmits a network congestion status via a header extension field of a RTP packet, so additional cost for amending protocols is not needed. In addition, the transmitter 100 periodically drops voice packets according to a packet dropped rate, so the network congestion status and the successful transmission probability of voice packets are improved. Furthermore, the receiver 200 recalculates the un-dropped voice packets using interpolation methods, so the voice quality is maintained.

Thus, if all transmitters 100 and all receivers 200 in a managed network support the packet transceiver method of the present invention, network efficiency can be effectively improved.

While various embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A packet transceiver system, comprising:
   a detection module, for detecting a network congestion status;
   a dropped rate determination module, for determining a packet dropped rate based on the network congestion status;
   a transmitting module, for transmitting voice packets, dropping voice packets according to the packet dropped rate, ensuring an even distribution of dropped voice packets during the transmission;
   a recalculation module, for receiving the un-dropped voice packets, and recalculating the dropped voice packets; and
   a reporting module, for reporting the network congestion status to the dropped rate determination module via a header extension field of a real-time transport protocol (RTP) packet, wherein the header extension field of the RTP packet comprises a protocol initial field, a protocol header field, and a severity of congestion field; the protocol initial field is for padding the header extension field, the protocol header field is for indicating a type of information in the severity of congestion field, and the severity of congestion field is for carrying the network congestion status.

2. The packet transceiver system as claimed in claim 1 wherein the transmitting module is also for transmitting a plurality of antecedent voice packets; the detection module is also for receiving the plurality of antecedent voice packets, and detecting the network congestion status according to sequence numbers of the antecedent voice packets.

3. The packet transceiver system as claimed in claim 1, wherein the network congestion status comprises a packet lost rate, and the dropped rate determination module determines the packet dropped rate based on the packet lost rate.

4. The packet transceiver system as claimed in claim 1, wherein the recalculation module recalculates the dropped voice packets using an interpolation method.

5. The packet transceiver system as claimed in claim 1, wherein the recalculation module is also for adding the recalculated voice packets to the received voice packets.

6. A packet transceiver method, comprising:
   providing a receiver and a transmitter;
   detecting a network congestion status by the receiver;
   reporting the network congestion status from the receiver to the transmitter via a header extension field of a real-time transport protocol (RTP) packet, wherein the header extension field of the RTP packet comprises a protocol initial field, a protocol header field, and a severity of congestion field; the protocol initial field is for padding the header extension field, the protocol header field is for indicating a type of information in the severity of congestion field, and the severity of congestion field is for carrying the network congestion status;
   determining a packet dropped rate based on the network congestion status by the transmitter;
   transmitting voice packets, dropping voice packets according to the packet dropped rate, ensuring an even distribution of dropped voice packets during the transmission; and
   receiving the un-dropped voice packets, and recalculating the dropped voice packets by the receiver.

7. The packet transceiver method as claimed in claim 6, wherein detecting the network congestion status by the receiver comprises:
   transmitting a plurality of antecedent voice packets from the transmitter to the receiver; and
   receiving the plurality of antecedent voice packets, and detecting the network congestion status according to sequence numbers of the antecedent voice packets by the receiver.

8. The packet transceiver method as claimed in claim 6, wherein the network congestion status comprises a packet lost rate, and the packet dropped rate is equal to the packet lost rate.

9. The packet transceiver method as claimed in claim 6, wherein recalculating the dropped voice packets comprises:
   recalculating the dropped voice packets using an interpolation method.

10. The packet transceiver method as claimed in claim 6, further comprising:
    adding the recalculated voice packets to the received voice packets.

11. A method for packet transmission from a transmitter to a receiver and, comprising steps of:
    detecting a network congestion status by a receiver, which receives packets from a transmitter, according to received packets from said transmitter;

reporting said network congestion status from said receiver to said transmitter via a header extension field of a real-time transport protocol (RTP) packet, wherein said header extension field of said RTP packet comprises a protocol initial field, a protocol header field, and a severity of congestion field; said protocol initial field is for padding said header extension field, said protocol header field is for indicating a type of information in said severity of congestion field, and said severity of congestion field is for carrying said network congestion status;

transmitting said detected network congestion status from said receiver to said transmitter; and transmitting packets by said transmitter in a way definable based on said network congestion status.

12. The method as claimed in claim 11, wherein a packet dropped rate is determined based on said network congestion status so as to define a packet dropped way as said definable way to transmit said packets by said transmitter.

* * * * *